United States Patent [19]
McNeill

[11] 3,840,902
[45] Oct. 15, 1974

[54] SAFETY BELT FOR MOTORCYCLES

[76] Inventor: Charles F. McNeill, 162 Mirin Ave., Roosevelt, N.Y. 11575

[22] Filed: Oct. 9, 1973

[21] Appl. No.: 404,177

[52] U.S. Cl. .............................. 2/311, 2/2
[51] Int. Cl. ............................... A41f 9/00
[58] Field of Search......... 2/2, 311, 312; 280/150 B, 280/150 SB

[56] References Cited
UNITED STATES PATENTS

| | | | |
|---|---|---|---|
| 3,458,188 | 7/1969 | Infante | 2/312 X |
| 3,487,474 | 1/1970 | DeMeo | 2/311 |
| 3,564,616 | 2/1971 | Battaglia | 2/311 |

Primary Examiner—Alfred R. Guest
Attorney, Agent, or Firm—Jacob L. Kollin

[57] ABSTRACT

A safety belt for motorcycles and similar motor vehicles. The belt comprises a detachable bumper cushion secured to its back to absorb sudden shocks to a tandem riding passenger in case of sudden stops. Hand grips are permanently secured to each side of the belt and safety loops for the passenger's arms are detachably secured to said belt. A pair of windbreaker shells are detachably secured to the belt's sides and partly enclose a space about the hand grips.

6 Claims, 7 Drawing Figures

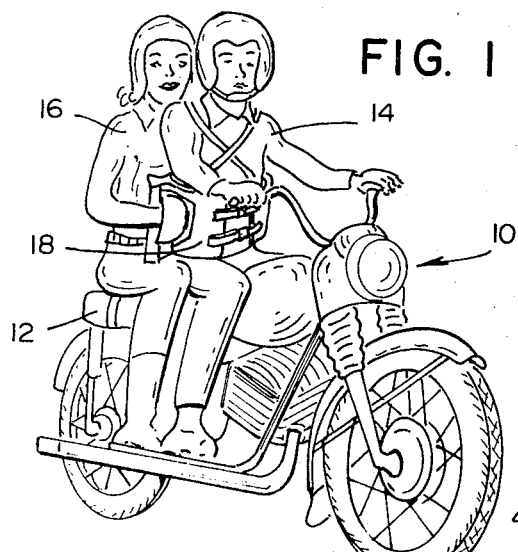
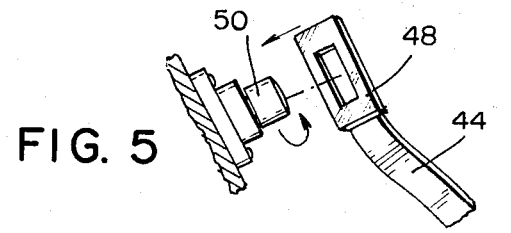
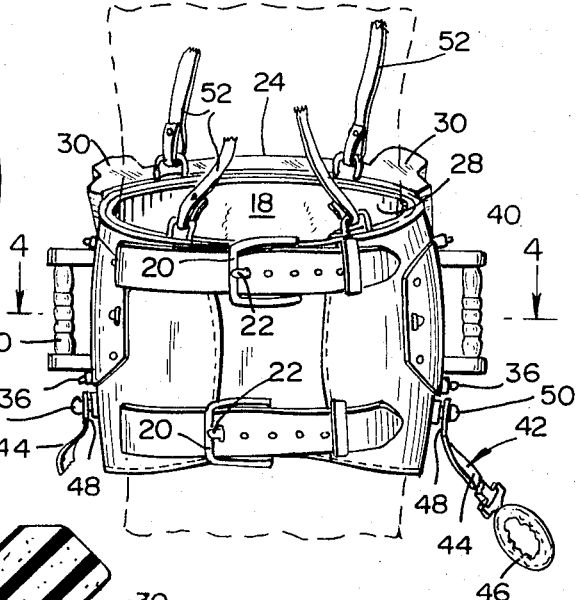
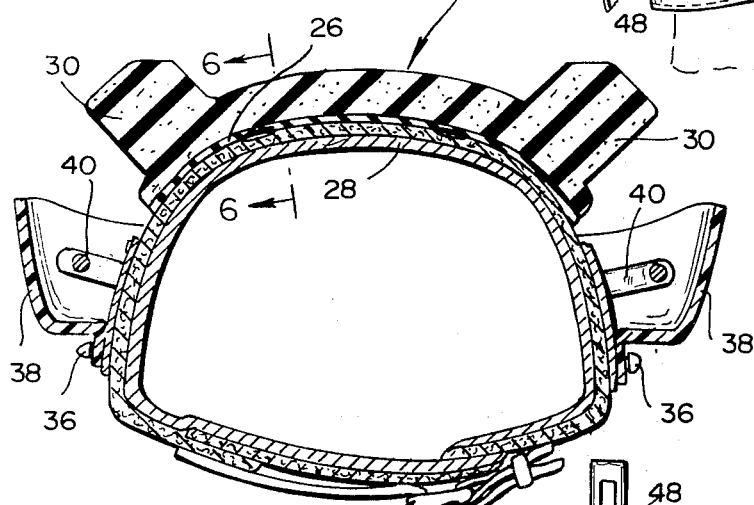
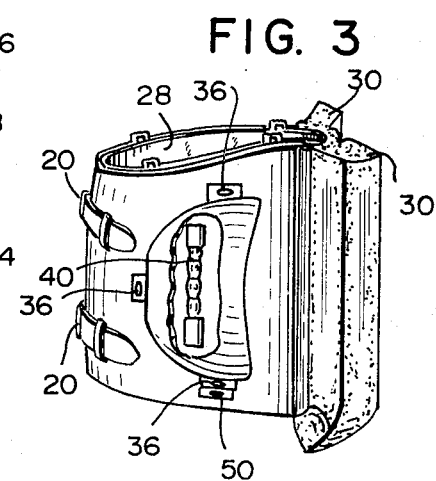
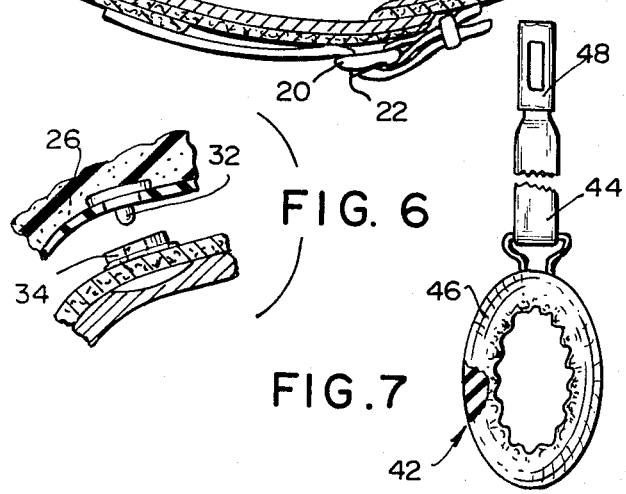
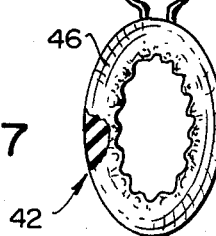

SAFETY BELT FOR MOTORCYCLES

BACKGROUND OF THE INVENTION

The invention relates to improvements in safety devices particularly for passenger riding in tandem on motorcycles and similar vehicles, behind the driver.

An important object of the invention is to provide a safety belt securable about the waist of a motorcycle driver, which is provided with a shock absorbing member which will prevent injury to the passenger riding in tandem on a seat behind the driver.

Another object of the invention is to provide a device of the above character which is provided with secure means for grasping the safety belt while the motorcycle is in motion.

A further object of the invention is to provide safety arm loops for the passenger to prevent the latter from falling off the motorcycle, when accidently losing the grip on the belt's grip handles.

Yet another object of the invention is to provide, on the belt, shields for the passenger's hands, which will tend to prevent injury to his hands in case of an accident and will also add to their comfort when riding against a wind, particularly in cold weather.

Yet another object of the invention is to provide a device of the above character which is sturdy and simple in construction and economical to manufacture.

These and other objects of the invention will become apparent from the following description in connection with the appended drawing illustrating a preferred embodiment of the invention. It is to be understood, however, that these are given by way of illustration and not of limitation and that changes may be made in the detail construction, form and size of the parts, without affecting the scope of the invention sought to be protected.

IN THE DRAWING:

FIG. 1 is a perspective view of the safety belt, as used on a motorcycle;

FIG. 2 is a front view of the belt;

FIG. 3 is a side view of the belt;

FIG. 4 is a cross-section taken on line 4—4 of FIG. 2;

FIG. 5 shows the method of securing the detachable safety arm loop to the belt;

FIG. 6 is a detail showing the method of securing the cushion to the belt and

FIG. 7 illustrates the detachable safety arm loop.

Referring now to the drawing in detail, the motorcycle 10 of any style or make includes a seat 12 for the driver and the passenger who rides in tandem thereon. The driver is indicated by the numeral 14 and the passenger by 16. Encircling the driver's waist is a flexible belt 18 of leather, leahter-like material or any suitable fabric. To one end of the belt are secured a pair of buckles 20 provided with the gripping means 22 to prevent slippage of the belt once it is positioned on the body of the driver.

To prevent shock to the passenger riding in tandem there is provided a "butterfly" shaped bumper cushion 24 preferably made of foam rubber. Secured by adhesive to the bumper cushion's concave face is a felt layer 28, for the driver's comfort. The cushion is secured to a hard rubber strip 26 which in turn is secured to the belt 24. The cushion is also formed with wings 30 to restrain the lateral movement of the passenger's body while riding. The bumper cushion is detachably secured to the belt by snap fasteners 32-34, so that it may be detached when not in use.

Secured to opposite sides of the rear portion of belt 18 by means of rivets 36 are a pair of arcuate-shaped windbreakers 38 which encircle partly hand-grips 40. The hand grips are permanently attached to the belt and provide a firm means for holding on by the passenger.

There are further provided safety arm loops 42 for inserting the passenger's hands when riding, so that if for some reason the hands are caused to release the hold on the grip-handles they will be held by these safety arm loops. The loops may be made of suitable strap material 44, to which are secured rubber loops 46 for the comfort of the passenger's wrists. The loops are detachably secured to belt 18 by means of a slit plate 48 attached to strap 44 and which is locked in place by turning the fasteners 50 after slipping the plate thereover.

The belt may be further provided with shoulder straps, such as are partly indicated by numeral 52.

Having thus disclosed my invention, what I claim and desire to protect by Letters Patent of the United States is:

1. An improved safety belt for use by passengers riding in tandem on a vehicle, comprising a belt of a flexible material having a front portion and a rear portion, means for securing said belt about a driver's waist, a pair of grip handles secured to said belt and shock absorbing means secured to the rear portion of said belt.

2. The device as claimed in claim 1, wherein said shock absorbing means comprises a bumper cushion of resilient material.

3. The device as claimed in claim 2, wherein said bumper cushion is of arcuate cross-section.

4. The device as claimed in claim 3, wherein said bumper cushion is formed with wing-like end portions.

5. The device as claimed in claim 1, further provided with a pair of arcuate windbreakers detachably secured to the sides of the belt, respectively, said windbreakers partly enclosing said grip handles.

6. The device as claimed in claim 1, wherein said shock absorbing means is detachably secured to said belt and means are provided for detachably securing the shock absorbing means.

* * * * *